United States Patent [19]

Vogg et al.

[11] Patent Number: 4,457,649
[45] Date of Patent: Jul. 3, 1984

[54] CARGO RESTRAINER WITH SPRING-BIAS LATCH

[75] Inventors: Günter Vogg; Hinrich Engel, both of Bremen; Eckhard Koch, Lilienthal-Kleinmoor, all of Fed. Rep. of Germany

[73] Assignee: Vereinigte Flugtechnische Werke GmbH, Bremen, Fed. Rep. of Germany

[21] Appl. No.: 339,129

[22] Filed: Jan. 13, 1982

[30] Foreign Application Priority Data

Feb. 28, 1981 [DE] Fed. Rep. of Germany ....... 3107745

[51] Int. Cl.³ .......................... B60P 7/08; B61D 45/00
[52] U.S. Cl. ......................................... 410/46; 410/69; 244/137 R; 244/118.1
[58] Field of Search ............. 244/137 R, 118.1, 118.2, 244/118.6, 137 L; 410/46, 52, 68, 75, 77, 78, 79, 80, 81, 92, 94, 95, 110, 115, 69, 70, 85, 84, 86, 87, 104

[56] References Cited

U.S. PATENT DOCUMENTS

| | | | |
|---|---|---|---|
| 3,262,588 | 7/1966 | Davidson | 244/137 R |
| 3,709,450 | 1/1973 | Watts et al. | 410/79 |
| 3,778,012 | 12/1973 | Fernandez | 410/69 |
| 3,906,870 | 9/1975 | Alberti | 244/137 R |
| 3,927,622 | 12/1975 | Voigt | 244/137 L |
| 3,933,101 | 1/1976 | Blas | 410/69 |
| 4,000,870 | 1/1977 | Davies | 410/94 |
| 4,331,412 | 5/1982 | Graf | 410/78 X |

Primary Examiner—David A. Scherbel

[57] ABSTRACT

A frame structure is fastened to two rails which normally serve in an aircraft for fastening the seating. That frame structure, in turn, holds a frame element to which is mounted a spring-biased latch hook; the frame element can be fastened to the frame structure in different positions, the latter having also a fixed end hook. The structure as a whole establishes a removable YZ restrainer that is readily adaptable to differently wide cargo pallets or the like.

9 Claims, 3 Drawing Figures

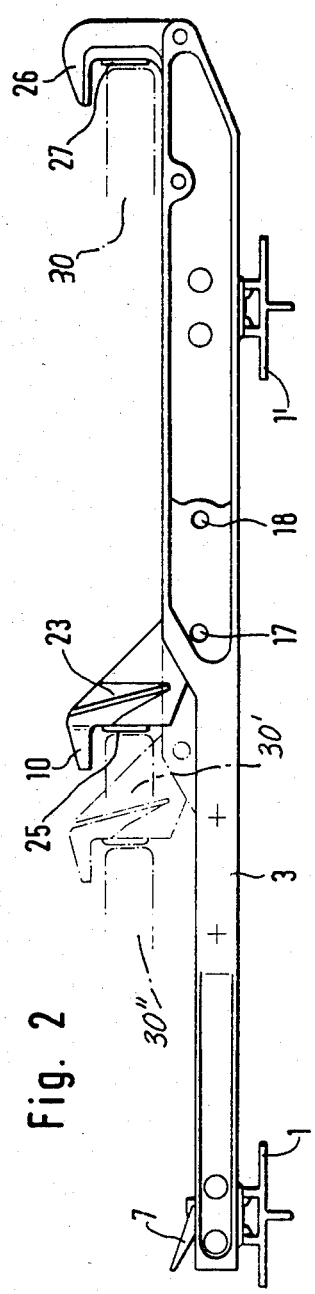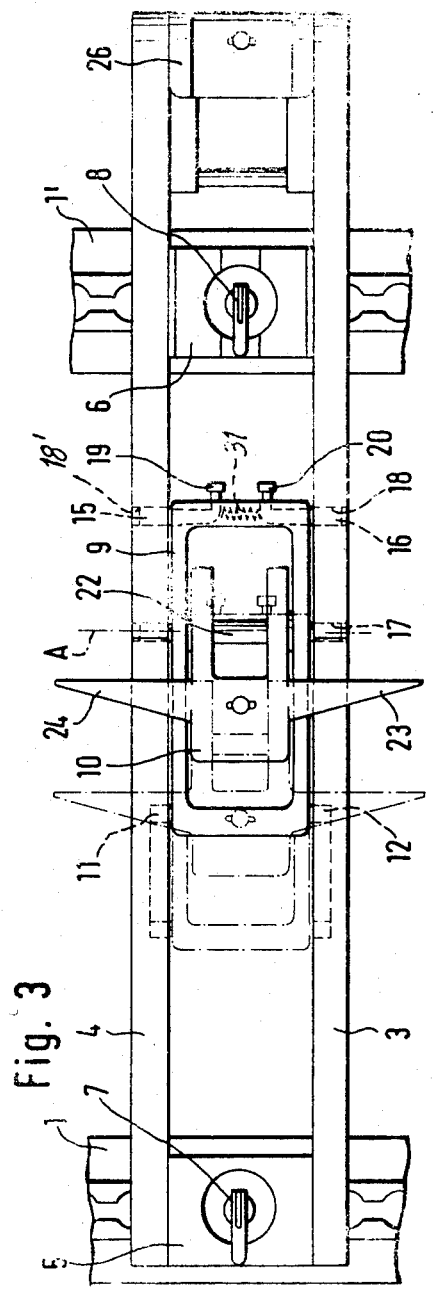

CARGO RESTRAINER WITH SPRING-BIAS LATCH

BACKGROUND OF THE INVENTION

The present invention relates to a latch element for restraining pieces of cargo against any tendency to be displaced on the floor in a freight compartment of an aircraft.

Large aircraft of the jumbo jet variety are usually provided with a large area cargo space, and restraining freight and cargo against movement in that space is a considerable problem. This is particularly so in the case of a wide-body aircraft in which the compartment is normally used for passengers but is to serve also as cargo space. The invention relates particularly to the restraining of cargo by means of structure which is releasably connectable to those floor rails to which normally the seating is fastened. Moreover, the restraining structure should permit retraction so that freight can pass over it.

Latching devices of the type to which the invention pertains are usually called YZ restrainers or latches, wherein Y denotes a lateral direction in the aircraft and Z is the vertical direction. Restraining requires immobilizing freight such as pallets or containers as against displacement in the Y- and Z-directions; within this coordinate scheme, X is the direction of movement of freight in the cargo space, and restraint may not be required, at least not as to individual pieces.

Considering the problem in some detail, it is apparent that the restrainers must be provided to accommodate pallets and containers; also, containers come in different widths. Thus, one has suggested to provide a plurality of such Y/Z latches, e.g., latches arranged in rows, with several latches in each Y-row. Only respective outer latches are used, depending upon the width of the container, etc.; and all latches not used can be rolled over.

Another problem is that wide-body planes are sometimes used as all-cargo planes, at other times for passenger transport. Hence, such a plane should be rather speedily adaptable for one and the other purpose. It is, therefore, customary to use floor rails for selectively fastening seats or cargo restrainers. In the latter case, one uses particular traverses. Since the latches have to have at least a minimum size, it was found difficult to use several latches on a traverse and in sufficient density to accommodate pieces of cargo that differ in size to a limited extent only. This, in turn, limits universality of such a restraining system as such.

Generally, as to the state of the art, reference is made to U.S. Pat. No. 3,709,450.

DESCRIPTION OF THE INVENTION

It is an object of the present invention to provide a new and improved cargo-restraining device for aircraft.

It is another object of the present invention to provide a new, improved cargo-restraining structure permitting ready adaptation to differently wide pieces of cargo such as pallets or containers without incurring undue excess weight.

It is a particular object of the present invention to provide an aircraft cargo-restraining device that permits removable fastening to rails normally provided for fastening of seating in the passenger compartment, the new cargo-restraining device to be fastened to the rails when the compartment is used for cargo transport.

In accordance with the preferred embodiment of the present invention, it is suggested to provide an elongated structure, such as two spaced but interconnected bars establishing a frame which, in turn, holds a frame element in between the bars and to be locked in different positions. The frame structure itself is provided for releasable connection to the above-mentioned floor rails. The frame elements hold a fold-down latch hook, and the structure has, preferably, a fixed latch hook at one end. The frame element is preferably positionable and secured to the frame structure in several not-too-different positions to, thereby, adapt the restraining device to not-too-differently wide pallets, containers, or the like.

The invention minimizes the total number of latch elements which have to be installed. The latch hook on the frame element is spring-biased and can be folded down to be held down by freight passing over or being positioned and held by the end hook. The latch hook on the frame element is, therefore, provided with run-off surfaces permitting a piece of cargo that passes in a direction transverse to the latching directions to fold the latch hook down. The frame element and the frame structure are moreover constructed so that the folded-down hook will not project above the conveyor plane.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 2 is a side elevation of the latch element shown in FIG. 1; and

FIG. 3 is a top elevation of the latch element shown in FIGS. 1 and 2.

Figure 1:
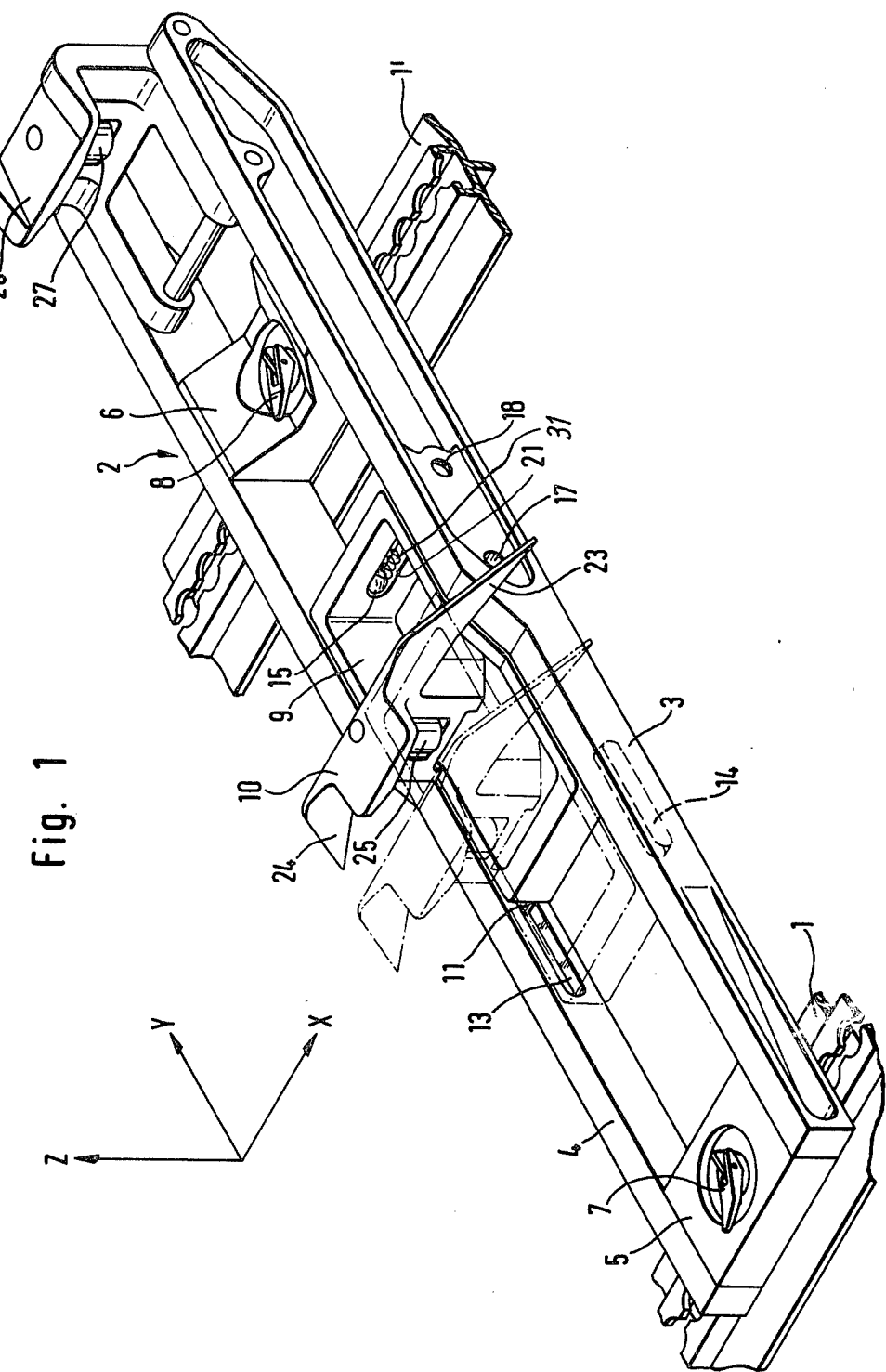
FIG. 1 is a perspective view of a latch element constructed in accordance with the preferred embodiment of the invention for practicing the best mode thereof.

Proceeding now to the detailed description of the drawings, the figures illustrate a latch element to be used as a Y/Z latch in the upper compartment of a wide-body aircraft. That compartment is used at times as a passenger compartment, at other times as a cargo compartment so that occasionally one has to change from one use to the other.

The floor of this compartment includes rails 1 and 1' for purposes of fastening seats to the floor. These rails extend in longitudinal direction X of the aircraft, and they are also to be used for removably mounting cargo restrainers. The restraining action is to be effective in the Y- and Z-directions.

The illustrated restraining element is comprised of a traverse or frame structure 2 having two bar-like sides 3 and 4 as major construction elements. These two bars 3 and 4 are held together by transverse-connecting pieces 5 and 6. These pieces 5 and 6 are respectively provided with quick release locks 7 and 8 for connection and clamping or locking to the floor rails such as 1 and 1'.

A frame element 9 is mounted to the inside of frame structure 2. Frame element 9 serves as pivot support for a latch hook 10 being pivotably linked to the frame accordingly. Frame element 9 itself is provided with pins 11 and 12, being situated near the front end of the frame 9 and being provided for engaging respectively guide or camming grooves 13 and 14 situated in the bars 3 and 4.

Two spring-biased pins 15 and 16 are provided near the rear of frame element 9, the bias tending to protract these pins. The bars 3 and 4 are provided with suitable sets of bores such as 17 and 18 into which these pins 15 and 16 can be inserted. The solid-line position of frame element 9, as illustrated in FIG. 3, shows pin 16 inserted in bore 18, pin 15 is analogously inserted in an oppositely located bore, 18'.

The pins 15 and 16 are constructed as L-shaped elements, the short legs respectively running in an oblong slot 21 and ending in externally accessible buttons 19 and 20, all in the rear transverse portion of frame element 9. A spring 31 tends to spread the pins 15 and 16 apart to lodge in the bores 18', 18. Upon squeezing bottoms 19 and 20 together, the pins 15 and 16 are retracted, thereby releasing the frame 9.

Reference numeral 22 refers to a transverse pin by means of which latch 10 is pivotally mounted to the frame 9. The latch 10 is additionally spring-biased (not shown). Pin 22 defines the pivot axis A which runs parallel to the rails 1 and 1'. Please note that in FIG. 3 the coincidence of axis A with the axis of bores 17 is purely coincidental. These bores 17 establish an alternative position for frame 9, and axis A will not be located there when the frame is placed into that position rather than the illustrated one where the pins 15 and 16 are in bores 18' and 18. Latch hook 10 is provided with lateral horns 23 and 24 having oblique run-off surfaces which run in the direction of freight movement. Latch 10 is additionally provided with a vertically oriented roller.

The figures show that bars 3 and 4 of frame structure 2 each have a portion of a lower height than the remainder of the respective bar. Likewise, the long elements of frame 9 have a similar step in height; the rear portion of frame 9 being higher than the front. The higher parts of bars 3 and 4 define the conveyor plane of the cargo system. The remainder of the bars being at a lower level, sufficient so that, upon folding-down of hook 10 the upwardly pointing surface of that hook is flush with the conveyor plane. Frame 9 is stepped down for the same reason.

The figures show also that rails or bars 3 and 4 have recesses, reducing the wall thickness thereof in regions outside bores 17 and 18 as well as in front of grooves 13 and 14. Bars 3 and 4 extend at one end beyond the connecting piece 6 and carry an end latch hook 26 which is not pivotable. Hook 26 is also provided with a roller 27.

It can, thus, be seen that the structure 2 constitutes an entity which can be installed by locking the rapid action connectors 7 and 8 to the two seat rails 1 and 1'. This orients the structure 2 automatically along the Y-axis. The latch hooks 10 and 26 do, thus, act as restrainers against displacement of any freight they engage in the Y- and the Z-directions.

The fixed position latch hook 26 is provided to restrain a maximum-width pallet 30 (see FIG. 2). As the pallet moves in the direction X and engages one of the obliquely oriented run-off surfaces of the horns 23 and 24, the hook 10 is forced down. This occurs independently from the relative position of frame 9 in frame structure 2.

Pallets of a shorter width can be accommodated by appropriately positioning frame 9 and its latch hook 10. The solidly drawn position illustrates one instance for locking a pallet 30'. The dash-dot position of, particularly, latch hook 10 illustrates an instance for accommodating a still narrower pallet 30''. The latter situation requires that frame 9 be unlocked (pulling in pins 15 and 16) and shifted or slid until the pins can enter the other set of bores (including 17).

The drawings show only two possible positions of frame 9; but it will be understood that many more can be provided for. Of course, the strength requirements for the structure 2 have to be taken in consideration.

The invention has been described in relation to the mounting latch hooks in the passenger compartment. The invention can be used also in the lower freight compartment, provided suitable rails (1 and 1') are installed.

We claim:

1. A restraining device for mounting to floor rails in an aircraft, the rails being constructed for normally having seating fastened thereto, comprising:
    an elongated structure including two parallely positioned bars and two connection pieces extending and being mounted between said bars and being provided for concurrent fastening to two of said floor rails;
    a frame slidably mounted, positioned, and held between said bars, and being provided with means for fastening to the bars of the structure in different positions; and
    a spring-biased latch hook retractably pivotable mounted in the frame, pivoting to occur about an axis that runs parallel to the two rails when the structure is fastened thereto, said latch hook being provided with lateral, oblique run-off-surfaces-defining extensions, so that the latch hook can be pivoted down on impact by a piece of cargo moving in the direction of said rails.

2. A restraining device as in claim 1, the the fastening means being constructed as quickly releasable latches to obtain the said fastening.

3. A restraining device, comprising:
    a pair of flat bars;
    connecting pieces interconnecting the bars to establish a frame-like structure having a space between the bars;
    fastening means on the connecting pieces for fastening to a floor structure;
    a frame element;
    means for mounting the frame element to the bars inside said space and in different positions therein;
    a spring-biased latch hook pivotably mounted to the frame element to normally assume an upright position, the latch hook permitted to fold down into the frame element, not to protrude beyond the upper edges of the bars, said latch hook being provided with lateral, oblique run-off-surfaces-defining extensions, so that the latch hook can be pivoted down on impact by a piece of cargo moving in the direction of said rails.

4. A restraining device as in claim 1 or 3, the bars being provided with aperture means for receiving pin means of the frame.

5. A restraining device as in claim 4, the aperture means including oblong slots, one per bar, and a plurality of individual apertures, the frame having pins for sliding in the slots and further, retractable pins for selective insertion in the individual apertures, thereby establishing locked positions of the frame in between the bars.

6. A restraining device as in claim 4, the bars being thicker where having the aperture means.

7. A restraining device as in claim 1 or 3, the structure having a first portion of lower height than a remaining portion, the frame being always located so that the latch hook, when folded down, is adjacent to the lower-height portion and the folded-down latch hook will not project upwardly beyond a plane defined by said remaining portion.

8. A restraining device as in claim 7, the frame having a stepped portion.

9. A restraining device as in claim 1 or 3, the structure having an additional, fixed, mounted latch hook.

* * * * *